United States Patent [19]

Beckerman

[11] 4,408,146
[45] Oct. 4, 1983

[54] AUTOMATIC DOOR OPERATOR

[75] Inventor: Howard L. Beckerman, Middletown, N.J.

[73] Assignee: Automatic Doorman, Inc., Paterson, N.J.

[21] Appl. No.: 229,793

[22] Filed: Jan. 30, 1981

[51] Int. Cl.³ .............................................. H02P 1/22
[52] U.S. Cl. ................................... 318/264; 318/265; 318/466; 318/469
[58] Field of Search ............. 318/474, 475, 476, 466, 318/469, 456, 434, 345 H, 345 D, 332, 286, 280, 265–267, 461, 463, 465, 264; 49/26–28

[56] References Cited

U.S. PATENT DOCUMENTS

| | | | |
|---|---|---|---|
| 638,150 | 11/1899 | Sautter | 318/663 |
| 2,661,450 | 12/1953 | Moler | 318/202 |
| 3,254,289 | 5/1966 | Hartman | 318/476 |
| 3,403,310 | 9/1968 | Davidoff | 318/18 |
| 3,470,431 | 9/1969 | Jones | 318/18 |
| 3,474,317 | 10/1969 | Delaney | 318/266 |
| 3,539,894 | 11/1970 | Feldman | 318/463 |
| 3,719,005 | 3/1973 | Carli | 49/28 |
| 3,764,874 | 10/1973 | Geoffrey | 318/266 |
| 3,813,590 | 5/1974 | Ellmore | 318/266 |
| 3,851,125 | 11/1974 | Deming et al. | 200/47 |
| 4,338,553 | 7/1982 | Scott, Jr. | 318/466 |

Primary Examiner—Ulysses Weldon

[57] ABSTRACT

An automatic door operator system is provided with a first potentiometer having its wiper arm coupled to a pivoting member whose angular position varies in accordance with the magnitude and direction of an obstructive load applied to the door. A second potentiometer is provided having its wiper arm coupled to a movable member whose position corresponds to the position of the door. The potentiometers are connected as voltage dividers and the voltages provided at their wiper arms are utilized for controlling the movement of the door.

19 Claims, 5 Drawing Figures

AUTOMATIC DOOR OPERATOR

DESCRIPTION

Background of the Invention

This invention relates to load positioners and, more particularly, to an electronically controlled load positioner suitable for use with a residential overhead garage door.

Automatic load positioners per se are well known in the prior art and in fact, automatic door operators for moving residential overhead garage doors have been in use for many years. Typically, such an overhead door rides along a track between a closed position and an open position, the door being driven by a reversible electric motor coupled thereto through either a chain and sprocket assembly or a worm drive. Various types of controls are required for such an operator. For example, it is essential that the operator have some means for determining the open and close limits of travel of the door. In the past, such a control has been achieved through the use of limit switches activated by, for example, a traveling nut on a rotating shaft. With such an arrangement, a pair of limit switches have been provided, one corresponding to each of the two extreme positions of the garage door. Such an arrangement provides a number of distinct disadvantages. For example, when installing such a system, the installer must very carefully make a series of adjustments to the positions of the limit switches so that they switch at the extreme open and close positions of the overhead garage door. These adjustments must be made with the power off. Then, the installer must turn the power on to check the adjustments. If improper, the power must be turned off to make further adjustments, and so on. An additional disadvantage of utilizing limit switches is that they are mechanical devices subject to wear and contact deterioration. It is therefore an object of the present invention to provide a door operator having an improved arrangement for sensing the door position and which may be easily adjusted with the power turned on.

Various safety standards have been developed over the years for door operators. This is especially important with residential garage door operators to reduce the risks to children. Most of these standards relate to the sensing of obstructions when the door is moving to deenergize, or even reverse, the motor when some minimum obstructive force is sensed. Prior art systems for sensing obstructive forces have included slip clutches, camming surfaces, or pivotal members in conjunction with a toggle switch, and some have proposed detecting the rise in motor current. However, none of these approaches are precise enough to meet the ever more rigid standards being set by industry and government for such operators. It is therefore an additional object of this invention to provide an improved obstruction sensing arrangement for use with an overhead door operator.

There are times when it is desirable to ignore the encountering of an obstruction by a traveling garage door. For example, when the door is within a small distance, for example two inches, of its close position, if an obstruction is sensed the motor should be deenergized but not reversed. Additionally, when the motor is first energized, all force sensing should be ignored for an initial period of time to allow the door to overcome its natural inertia to being moved. It is therefore a further object of this invention to provide an arrangement which is selective in its response to obstruction sensing.

It is a still further object of this invention to provide an overhead door operator which responds not only to the magnitude of obstructive forces but also responds to rapid changes in obstructive forces. Thus, for example, if a traveling door encounters a small child, the door should be reversed prior to exerting a harmful force on the child.

SUMMARY OF THE INVENTION

The foregoing and additional objects are attained in accordance with the principles of this invention by providing a door operator including means for generating a force signal which changes as a predictable function of the force opposing movement of the door. Means are provided for measuring the time rate of change of the force signal and deenergizing the motor when the magnitude of the time rate of change of the force signal exceeds a predetermined value.

In accordance with an aspect of this invention, means are provided for measuring the magnitude of the force signal and deenergizing the motor when the magnitude exceeds a predetermined threshold.

In accordance with another aspect of this invention, the door operator includes means for generating a position voltage which is predictably related to the position of the door. A first limit voltage is provided corresponding to the open position of the door and a second limit voltage is provided corresponding to the closed position of the door. Means are provided for continuously comparing the position voltage to the first and second limit voltages and deenergizing the door operator motor when the position voltage goes to either end of the range set by the first and second limit voltages.

In accordance with yet another aspect of this invention, the first and second limit voltages may be adjusted by an installer with power turned on.

BRIEF DESCRIPTION OF THE DRAWINGS

The foregoing will be more readily apparent upon reading the following description in conjunction with the drawings, wherein.

DETAILED DESCRIPTION

Figure 1:
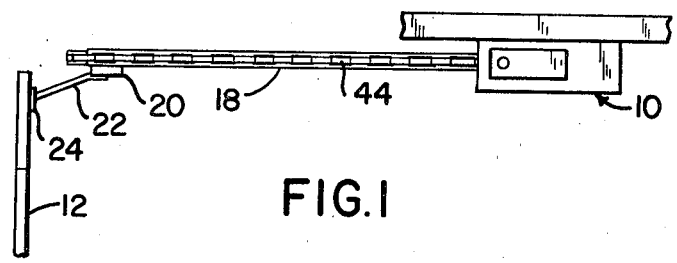
FIG. 1 illustrates a garage door equipped with an automatic door operator constructed in accordance with the principles of this invention.
Figure 2:
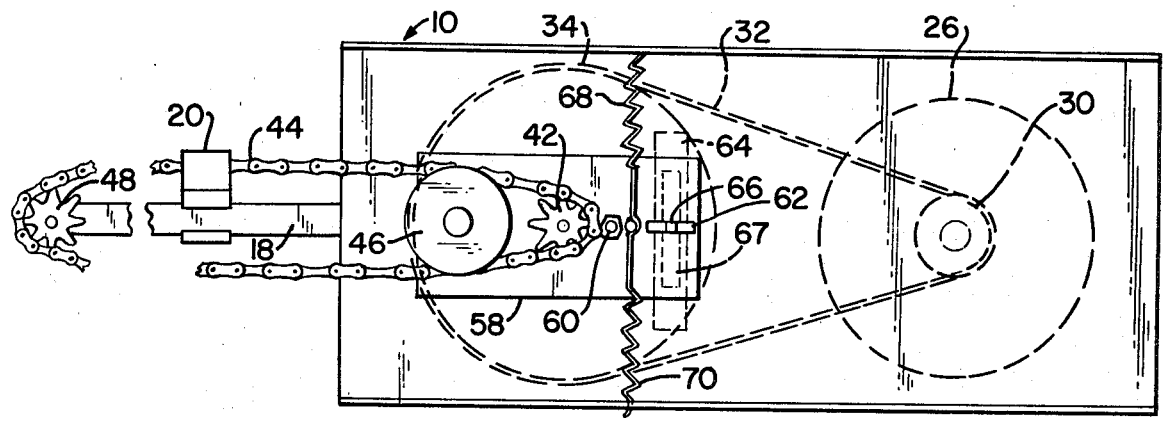
FIG. 2 is a side view of the door operator, with its housing covers removed, showing an illustrative arrangement for generating the position voltage.
Figure 3:
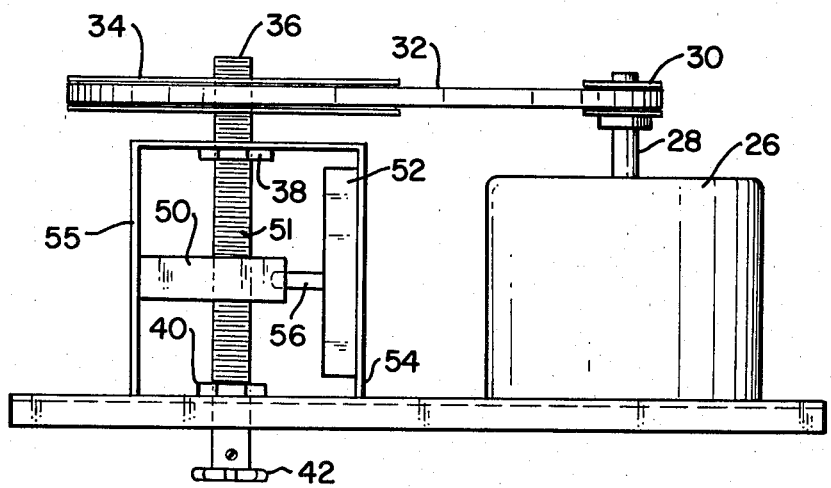
FIG. 3 is a top plan view of the door operator showing an illustrative arrangement for generating the force signal.

Referring now to the drawings, wherein like elements in different figures thereof have the same reference character applied thereto, FIGS. 1, 2 and 3 show a motor driven door operator, designated generally by the reference numeral 10, which may be manually or remotely controlled for opening and closing an upwardly acting door 12. The door 12 is illustratively a residential garage door including several horizontally hinged sections having rollers mounted thereon for engagement with side rails for guiding movement of the door 12 between a lower substantially vertical closed position and an upper substantially horizontal open position. The operator 10 includes an elongated horizontal beam 18 defining a guide rail along which a carriage 20 is supported for movement lengthwise thereof. The beam 18 is supported at one end by a suitable mounting secured to the wall above the door 12 and at the other end by a suitable support within the housing of the operator 10, which in turn is suitably suspended from the garage ceiling or rafters. The carriage 20 is pivotally connected to the upper end of an arm 22, which arm 22 at its lower end is connected to the door 12 by means of a plate 24.

To move the carriage 20, the operator 10 includes a reversible electric motor 26 which has an output shaft 28 connected to a pulley 30. The pulley 30 engages a drive belt 32 which drives a larger dimeter pulley 34. The pulley 34 is drivingly coupled to a shaft 36 journaled for rotation in two spaced apart bearings 38 and 40. The end of the shaft 36 opposite the pulley 34 has connected thereto a toothed drive sprocket wheel 42. A drive chain 44 is in engagement with the sprocket wheel 42 and extends around an idler 46 to an idler sprocket wheel 48 at the far end of the beam 18. The ends of the chain 44 are coupled to the carriage 20. Accordingly, as the motor 26 rotates, the sprocket wheel 42 drives the chain 44 to move the carriage 20 lengthwise along the beam 18, whereby the door 12 is moved in either an opening or closing direction, depending upon the direction of rotation of the motor 26.

In accordance with the principles of this invention, the shaft 36 is externally threaded between the bearings 38 and 40. An internally threaded nut 50 rides on the threads 51 of the shaft 36. A linear potentiometer 52 is suitably mounted on a circuit board 54 and is directed substantially parallel to the shaft 36. An extension 56 of the wiper arm of the potentiometer 52 is inserted into a hole in the nut 50. The nut 50 is squared off and rides against the plate 55 so as to prevent the nut 50 from rotating. Rotation of the shaft 36 thus causes the nut 50 to move lengthwise on the shaft 36. Thus, whenever the drive sprocket wheel 42 is rotated to open or close the door 12, the nut 50 will move the wiper arm of the potentiometer 52 within a range of positions corresponding to the range of positions of the door 12.

The idler 46, around which the chain 44 passes, is mounted on a pivot arm 58, pivoted at 60. The pivot arm 58 has a slot 62 at its end opposite the idler 46. A linear potentiometer 64 is mounted on the chassis of the door operator and is directed substantially perpendicular to the pivot arm 58. An extension 66 of the wiper arm of the potentiometer 64 extends through a slot 67 of the chassis and is captured within the slot 62. When the carriage 20 is traveling either forward or backward along the beam 18, thereby moving the door 12 toward its open or closed position, and an obstruction is encountered, a force will be exerted on the chain 44. The exertion of a force on the chain 44 will tension one side of the chain 44 relative to the other and, through the idler 46, will cause the pivot arm 58 to pivot toward the side with less tension. This moves the wiper arm of the potentiometer 64. It will be noted that the wiper arm of the potentiometer 64 will move in one direction from a neutral position if the door 12 meets an obstruction while closing and will move in the other direction from the neutral position if the door 12 meets an obstruction while opening. This movement is predictably related to the force opposing movement of the door 12. If desired, a pair of springs 68, 70, may be provided to bias the pivot arm 58 toward a central, or neutral, position.

Figure 4:
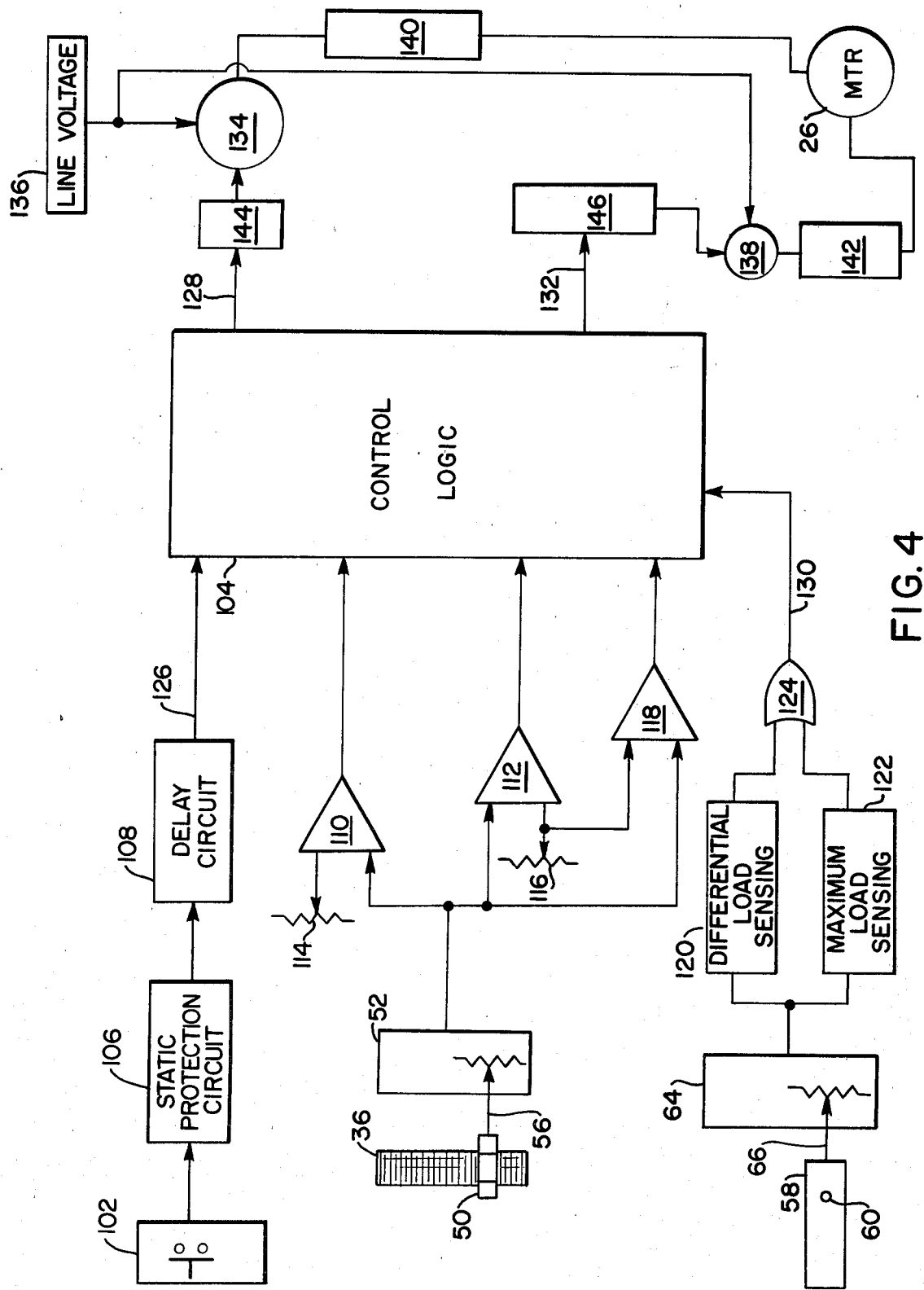
FIG. 4 is a block logic diagram illustrating the principles of operation of a door operator control system constructed in accordance with the principles of this invention.

FIG. 4 is a block diagram useful for illustrating the principles of operation of a system constructed in accordance with this invention. A switch 102 is wired to the control logic 104 through a static protection circuit 106. The purpose of the circuit 106 is to stop any high voltages, which may be generated by lightning, walking across a carpet, sliding across a car seat, etc., from damaging the control logic 104. Although for simplicity a two terminal pushbutton switch 102 is illustrated, it is understood that other contact closure devices, such as a remote controlled radio receiver, may be utilized in parallel with the switch 102 to provide a circuit completion function. From the static protection circuit 106, the switch closure initiated signal goes to the delay circuit 108. The switch 102 must be closed for a specified time period, illustratively one tenth of a second, before the delay circuit 108 will provide an output signal to the control logic 104. The delay circuit 108 thus eliminates transient or spurious signals.

As described previously, the wiper arm of the position sensing potentiometer 52 moves predictably in accordance with the position of the door 12 and acts as a voltage divider to provide a DC position voltage, which an vary from zero to the full value of the power supply. The position voltage is thus predictably related to the position of the door 12. This position voltage is fed to two comparators, an open comparator 110 and a close comparator 112. Each of the two comparators 110, 112, has its own trim potentiometer 114 and 116, respectively. Each trim potentiometer 114, 116, forms a voltage divider and is set to a different voltage, which is prevented from overlapping the voltage range of the other. When the door 12 is being opened and the voltage output from the position sensing potentiometer 52 goes beyond the voltage setting of the open trim potentiometer 114, the open comparator 110 signals the control logic 104. When the door 12 is being closed and the voltage output from the position sensing potentiometer 52 goes beyond the voltage setting of the closed position potentiometer 116, the close comparator 112 signals the control logic 104. The trim potentiometers 114 and 116 thus establish the up and down limits of the door 12. It is evident from the foregoing that if the door 12 has reached the system's down limit without reaching the floor, adjusting the close potentiometer 116 will cause the motor 26 to be reenergized and close the door further. This same form of instantaneously responsive adjustment is also possible on the open cycle via the open trim potentiometer 114.

Once the close limit is set for full closing of the door 12, the output voltage from the close trim potentiometer 116 corresponds to the door's fully closed position as sensed by the position sensing potentiometer 52. Whenever the voltage output from the position sensing potentiometer 52 comes within a preset value of the setting of the close trim potentiometer 116, the two inches from the floor comparator 118 signals the control logic 104.

As was mentioned previously, the wiper arm of the linear potentiometer 64 moves predictably in response to changes in the load on the door 12 and acts as a voltage divider to provide a DC voltage, predictably related to the force opposing movement of the door 12, on its wiper arm that is fed to two circuits; a differential load sensing circuit 120 and a maximum load sensing circuit 122. In the differential load sensing circuit 120, the voltage output from the wiper arm of the linear potentiometer 64 is filtered and only the variations in voltage are used. When these variations exceed a preset limit, an output signal is transmitted through the OR gate 124 to the control logic 104. When the wiper arm of the load sensing potentiometer 64 is in the middle, or neutral, position the door load is zero and the voltage output from the wiper arm is half that of the power supply. When in response to a load in either the opening or closing cycle, the wiper arm moves in one direction or the other to cause either a high or low voltage to appear thereon, the maximum load sensing circuit 122 compares this voltage to its preset limits, which establish the maximum load the door opener should safely handle. The differential load sensing circuit 120 is preset to respond to load variations just in excess of the rapidly occurring variations that are a result of the jerking, binding and releasing, and other load disturbances in the normal movement of an unobstructed door. This circuit 120 does not respond either to the constant weight of the door 12 or to load variations that build gradually, as when the rollers of the door 12 must turn a corner of the side rails. Therefore, whether the door 12 weighs two pounds or two hundred pounds, the differential load sensing circuit 120 will theoretically detect even a two ounce sudden change in load that results from an obstruction. Once preset by the manufacturer, neither the maximum load sensing circuit 122 nor the differential load sensing circuit 120 needs any further adjustment by the installer of the door operator. This is an important safety feature because it is undesirable to allow the installer to make adjustments to compensate for particular obstructions, such as bent side rails. The installer must fix the door so that the controller will always operate within the factory set limits.

The control logic 104 processes the various input signals just described. Assuming that the door 12 is initially closed, upon receipt of a time delayed switch closure signal over the lead 126, the control logic 104 activates the open output 128 until the open comparator 110 signals that the door 12 has reached its preset open limit. If, during the opening cycle, another switch closure is signalled over the lead 126, the control logic 104 will terminate the open output 128. The open output 128 will remain in this state and the door 12 will not be moved until the next contact closure of the switch 102, whereupon the open output 128 will again be activated, causing the opening of the door 12 to be resumed. If the control logic 104 receives a signal from the load sensing circuits over the lead 130 during the opening cycle, the control logic 104 will deenergize the open output 128. The next contact closure of the switch 102 will cause the control logic 104 to reactivate the open output 128. The next contact closure after the door 12 reaches the open limit causes the control logic 104 to activate the close output 132.

Once the close output 132 has been activated, the closing cycle will continue until the close comparator 112 signals that the close limit has been reached. If at any time during the closing cycle either a contact closure over the lead 126 or a load sensing signal over the lead 130 occurs, the control logic 104 will immediately reverse the direction of travel of the door 12 by deactivating the close output 132 and activating the open output 128. The only exception occurs when the door 12 is less than approximately two inches from its close limit, as signaled by the comparator 118. Under these circumstances, the close output 132 will be deactivated without an energization of the open output 128.

As will be described hereinafter, included within the control logic 104 is a timer circuit which lights a lamp for a preset period of time whenever there is a switch closure signal over the lead 126. Another timer circuit deactivates the close output 132 and activates the open output 128 if the close limit is not reached within a predetermined time after initiation of a closing cycle. A third timer circuit causes load sensing signals on the lead 130 to be ignored for a short interval after either the open output 128 or the close output 132 is activated to prevent the control logic 104 from falsely triggering due to load sensing signals caused by the inertial bucking that typically accompanies the initiation of door movement.

The power section of the door operator circuit, to be described in full detail hereinafter, uses two triacs to apply power to the meter 26. A first triac 134 conducts the line voltage 136 to the open winding of the motor 26. The second triac 138 conducts the line voltage 136 to the close winding of the motor 26. Power resistors 140 and 142 limit the electrical current surges to each of the triacs 134 and 138, respectively. Each of the triacs 134 and 138 is signaled to turn on through its own high voltage isolator 144 and 146, respectively. The isolators 144 and 146 isolate the low voltage DC logic circuitry of the control logic 104 from the high voltage line current, which is AC. When either the open output 128 or the close output 132 is activated, its connected isolator 144, 146, activates the gate of the connected triac 134, 138. This causes the respective one of the triacs 134, 138, to avalanche and thereby energize either the open or the close winding of the motor 26.

Figure 5:
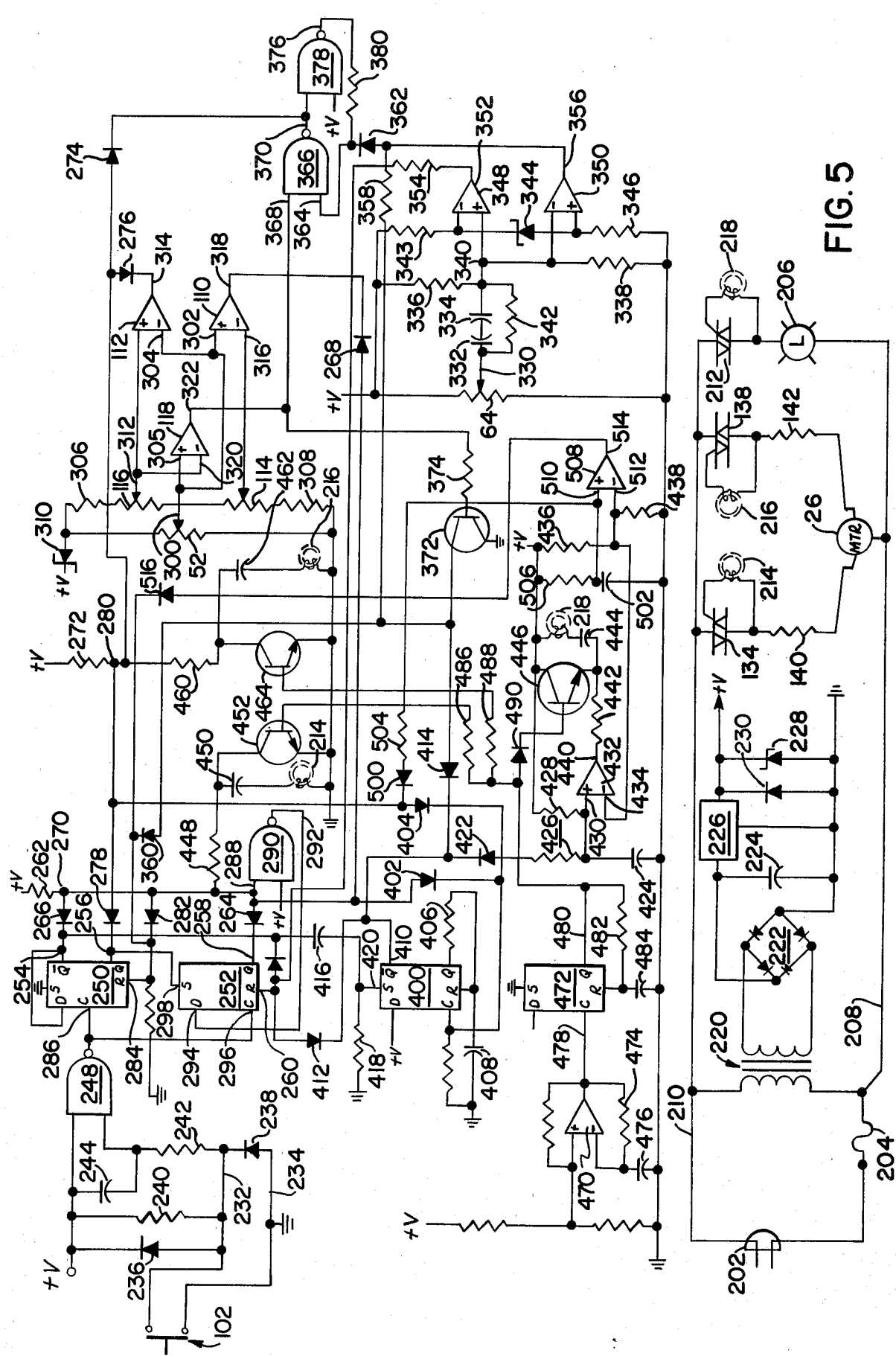
FIG. 5 is a detailed schematic circuit diagram of an illustrative door operator control system according to this invention.

Referring to FIG. 5 for a detailed circuit diagram of the system shown in, and described with respect to, FIG. 4, the garage door opener circuit takes commercially available AC power in through a line cord 202. A fuse 204 provides overcurrent protection. The motor 26 and lamp 206 common leads are wired to the hot side 208 of the line, while the neutral side 210 of the line is connected to triac 134, triac 138 and triac 212. The triacs 134, 138 and 212 each have a respective transformer secondary 214, 216 and 218 connected to their gate. Triacs 134 and 138 each have a surge protection resistor 140 and 142, respectively, connected serially therewith to prevent the triacs 134 and 138 from blowing out when first turned on into the capacitively loaded motor 26.

The logic circuitry DC power supply consists of a 120 volt to 16 volt transformer 220 whose output is full wave rectified by the diode bridge 222 and then filtered by capacitor 224. The filtered voltage is then regulated by the voltage regulator 226, which is illustratively a Motorola type MC 78L12 voltage regulator, and protected from transient surges by a combination of the zener diode 228 and the diode 230 to provide the +15 volts low voltage DC supply. The transformer 220 and the transformers 214, 216 and 218 provide the high voltage to low voltage isolation required for safety.

In the logic circuitry portion, the push button switch 102 connects the lead 232 to the lead 234 when closed. Diodes 236 and 238 function as the static protection circuit 106. Diode 236 becomes conductive if the lead 232 tries to go above the V+ line while the diode 238 conducts if the lead 232 tries to go more negative than the lead 234, which is at ground. Resistors 240 and 242 and capacitor 244 form the time delay circuit 108 which delays the turn-on of the NAND gate 248 for one tenth of a second after closure of the switch 102. This is a transient filter protection circuit which requires that the switch 102 be closed for a full tenth of a second before a positive going transition is seen at the output of the NAND gate 248. The flip-flops 250 and 252, which are D-type flip-flops, interpret this transition to determine whether the door 12 should be opening, closing or stopping, depending upon the condition of their inputs.

If the door 12 is in its opening cycle, then output 254 of flip-flop 250 will be high and output 256 will be low. Flip-flop 252 will have output 258 high and input 260, its reset input, will be low. Resistor 262, along with diodes 264, 266 and 268, form a three input "open" AND gate. All of the anodes of the diodes 264, 266 and 268 must be high in order for the open node 270 to go high. Resistor 272, along with diodes 274, 276 and 278, form a three input "close" AND gate. Again, all three diode anodes must be high for the close node 280 to go high.

With output 256 of flip-flop 250 low, diode 278 is conducting and holding the close node 280 low. With output 254 of flip-flop 250 high, diode 266 is non-conductive, therefore allowing the open node 270 to be high. With the open node 270 high, diode 282 is conducting, causing reset input 284 of flip-flop 250 to be high, inhibiting the flip-flop 250 from responding to any further clock pulses at the input 286 as a result of closures of the switch 102. In addition, input 288 of NAND gate 290 is also being held high by the open node 270, therefore its output 292 will be low, causing the data input 294 of flip-flop 252 to be low, readying the flip-flop 252 to bring its output 258 low on the next clock pulse at the input 296 due to closure of the switch 102. A low on output 258 will cause diode 264 to be conductive, thereby pulling the open node 270 low and stopping the opening of the garage door 12. Thus, the garage door 12 is in the state where it is neither opening nor closing and is just stopped somewhere between being fully open and fully closed. The low at the open node 270 causes reset input 284 of flip-flop 250 now to go low, since diode 282 is now non-conductive and that in turn causes output 292 of NAND gate 290 to go back to its high state. With the next switch closure pulse, flip-flops 250 and 252 are both clocked. However, the output 258 of flip-flop 252 immediately goes high, causing the open node 270 to go high, and resetting flip-flop 250 through diode 282. This starts the garage door 12 reopening. With reset 284 of flip-flop 250 now held high by the open node 270, again this section is disabled and the next clock pulse will cause flip-flop 252 output 258 to go low, bringing the open node 270 low.

After the door 12 reaches its full open position, the open node 270 will be held low. The output of AND gate 290 will be high, causing data input 294 of flip-flop 252 to be high. With the next switch closure pulse, flip-flop 252 remains in the same state and flip-flop 250 changes state, causing the close node 280 to go high because diode 278 is now non-conductive. Output 254 of flip-flop 250 goes low, keeping the open node 270 low through diode 266. The door 12 is now closing.

The next switch closure pulse into input 286 of flip-flop 250 causes output 254 to go high and output 256 to go low, thereby stopping the closing action and instantly starting an opening action. This is the instant reverse feature. With the open node 270 high again, diode 282 is again conductive and disables flip-flop 250 through input 284. Output 258 of flip-flop 252 is low, causing the data of flip-flop 252 to be ready to go low with the next switch closure pulse, and thereby causing the stoppage of the opening stroke through diode 264. Accordingly, with each successive switch closure pulse, the door 12 will be caused to open, stop opening, (until it reaches full open this will be repeated), close, and instantly reverse from the closing to the opening stroke.

The open and close limits for the door 12 are set through the use of the linear potentiometer 52, connected as a voltage divider, and the open and close trim potentiometers 114 and 116, respectively. The wiper arm 300 of the linear potentiometer 52 is coupled to the traveling nut 50 which rides on the threaded shaft 26 which is attached to the sprocket wheel 42 of the garage door opener chain 44. Since the wheel 42 drives the chain 44, and the position of the chain 44 determines the position of the door 12, the position of the wiper arm 300 is directly and predictably related to the position of the door 12. With each wiper arm 300 position, there is a position voltage output thereon. This position voltage is connected to input 302 of open comparator 110, input 304 of close comparator 112, and input 305 of comparator 118. The voltage divider made up of resistances 306, 116, 114 and 308 forms the settings for the close and open limits of the door 12. Zener diode 310 is a 3.3 volt zener diode and drops the voltage to the voltage divider and the linear potentiometer 52 to 3.3 volts below V+. This is because the inputs of the comparators 110, 112 and 118 will not respond to a voltage going all the way to V+.

Resistors 306 and 308 insure that the wiper of potentiometer 116 will not go to the new V+ setting and the wiper of potentiometer 114 will not go to the ground potential. Also, the travel of the linear potentiometer 52 is limited so that it will not mechanically go beyond its resistance limits. Potentiometers 116 and 114 are connected in series so that a setting of potentiometer 114 will never have a higher voltage than the lowest setting of potentiometer 116. Therefore, the close and open settings cannot overlap. With potentiometer 116 at a particular setting, a voltage is established on its wiper arm 312. The linear potentiometer 52 wiper 300 has a changing voltage thereon as the door 12 is moved, and this is applied to the inverting input 304 of comparator 112. The non-inverting input of comparator 112 has thereon a voltage which does not change, set by wiper 312 of potentiometer 116. When the voltage on wiper 300 exceeds that of wiper 312, then the output 314 of comparator 112 goes low, causing diode 276 to go into its conductive state and bring the close node 280 low, thereby stopping the closing stroke of the door 12. It can be seen in this circuit that if someone were to adjust potentiometer 116 to a slightly higher voltage, the close node 280 would go high and the garage door 12 would start to move again toward the closed position. In this manner the close limit can be set with power on so that the close limit is easily and accurately established. Similarly, the open limit is established by the setting of potentiometer 114. The voltage to the inverting input 316 of comparator 110 is compared to the linear potentiometer 52 wiper 300 voltage at input 302. When input 302 has a potential thereon that goes below the potential at input 316, then the output 318 of comparator 110 goes low, causing diode 268 to go into conduction, pulling the open node 270 low and stopping the door 12 from opening further. If potentiometer 114 were to be adjusted so that its voltage was lower than that of the linear potentiometer 52 wiper 300, output 318 would go high again, causing the open node 270 to go high and the door 12 would move to its new open position.

Comparator 118 provides the function of sensing when the door 12 is within two inches of its close limit. Input 320 of comparator 118 takes in the voltage setting of the close limit potentiometer 116 and compares it to the position of the linear potentiometer 52 wiper 300. When wiper 300 becomes more positive than wiper 312, the output 322 of comparator 118 goes high and signals various circuitry that the door 12 is two inches from its close limit. This signal is utilized by the load sensing circuitry, which will be described next. It will be noted that the two inches from the close limit is automatically established when the close limit is set.

Load sensing is accomplished by reading the voltage from the wiper arm 330 of the linear potentiometer 64. The linear potentiometer 64 is mechanically connected to the door operator, as previously described, so that its wiper arm 330 moves in a first direction when sensing an increased load while the door 12 is opening, and moves in the other direction when sensing an increased load while the door 12 is closing. The potentiometer 64 is connected as a voltage divider and its wiper arm 330 maintains a neutral voltage value when no obstructive forces are exerted on the door 12. The voltage at the wiper arm 330 is fed to capacitors 332 and 334, which together form a polarity independent capacitor. Equal resistors 336 and 338 form a half V+ voltage divider. When the wiper arm 330 force voltage output of the linear potentiometer 64 changes slowly, capacitors 332 and 334 will charge slowly, and cause a small signal output to be seen at the node 340. If the change is very rapid, a much larger signal will be seen at the node 340. A constant load on the door 12 will cause no signal change at the node 340. Thus, the function of a differential load sensor is achieved.

Resistor 342 performs the function of a maximum load sensing circuit, whereby with a particular position of the wiper arm 330 of the linear potentiometer 64 under a constant load, this will establish a steady voltage at the node 340. Thus, the capacitors 332 and 334 together form a differentiator which measures the time rate of change of the force voltage and provides a first partial force signal related thereto, the resistor 342 forms a maximum force measurer which measures the magnitude of the force voltage (its deviation from its neutral value) and provides a second partial force signal related thereto, and the node 340 functions to combine the first and second partial force signals into an obstruction signal. Resistor 343, zener diode 344 and resistor 346 form the limit comparison circuit for the load sensing comparators 348 and 350. The resistors 336, 338, 343 and 346 all have the same value.

When the obstruction signal at the 340 goes more positive than the anode of the zener diode 344, the output 352 of the comparator 348 will go from its normally low state to a high state and cause the reset input 260 of flip-flop 252 to immediately go low and stop the open through diode 264 to the open node 270. On the other hand, if the node 340 goes more negative than the cathode of zener diode 344, then the output 356 of comparator 350 goes high and through resistor 358 and subsequently diode 360, which now is in its conductive state, causes the reset input 284 of flip-flop 250 to go high, thereby resetting the flip-flop 250. This causes the output 256 to go low and the output 254 to go high, which results in stopping the closing stroke and instantly turning on the open node 270 through diode 266. Therefore, the door 12 instantly reverses from the closing to the opening stroke. Output 356 of comparator 350, when it goes high, also causes diode 362 to go into its conductive state, thereby pulling input 364 of NAND gate 366 high. If this happens when input 368 is high, input 368 being high when the output 322 from comparator 118 is also high, then output 370 of NAND gate 366 will go low, causing diode 274 to become conductive and stopping the close cycle.

When output 322 of comparator 118 is high, transistor 372, through resistor 374, is conducting and this stops the signal from output 356 of comparator 350 from getting back to the reset input 284 of flip-flop 250. Therefore, if there is a load sensing pulse at the node 340 when the two inches from the close limit sensing comparator 118 is high, then the door 12 does not stop and instantly reverse, it merely stops. When output 370 of NAND gate 366 is low, it means that output 376 of NAND gate 378 is high. Resistor 380 provides a latching feedback loop to input 364 of NAND gate 366, so that once input 364 is momentarily high while input 368 is high, the door 12 will stop and remain stopped until output 322 of comparator 118 again goes low during the opening stroke.

The load sensing circuitry has an additional portion, the ignore circuit. The function of the ignore circuit is to ignore the signals from the comparators 348 and 350 for the first half second after initiation of an opening or a closing cycle because the inertia of the door 12 causes overload conditions during this time. This function is provided by flip-flop 400, a D-type flip-flop. The flip-flop 400 is clocked through diode 402 from the opening node 270 and through diode 404 from the close node 280. When flip-flop 400 is clocked, resistor 406 and capacitor 408 form a timing circuit that times a pulse for one half second. During this half second, output 410 of flip-flop 400 goes low, causing diode 412 to go into its conductive state, and holding the reset input 260 of flip-flop 252 low so that it will not respond to any open load sensing pulses from comparator 348. In addition, output 410 of flip-flop 400 being low holds diode 414 in its conductive state, thereby inhibiting any close load pulses from the load sensing circuit. Further insurance that the ignore circuit will operate, even during instant reverse, is provided by capacitor 416 and pulldown resistor 418. When the flip-flop 250 changes state to go through instant reverse, output 254 of flip-flop 250 will go high, supplying a pulse through capacitor 416 to the set input 420 of flip-flop 400. This will cause the flip-flop 400 to initialize into its half second ignore mode.

When output 410 of flip-flop 400, the ignore timer, goes low, diode 422 becomes conductive and discharges capacitor 424 through resistor 426. These two components are in the lamp timer circuit and capacitor 424 and resistor 426 form the timing elements thereof. Their junction is fed into input 430 of comparator 432, where the voltage thereat is compared with the voltage on the input 434, which is connected to the voltage divider circuit of resistor 436 and resistor 438 for voltage reference. When the voltage at the input 430 goes more positive than the voltage at the input 434, output 440 will go low, causing current to be drawn through resistor 442, thereby charging capacitor 444 through the primary of transformer 218. Transformer 218 triggers triac 212, as will be next described.

Transistor 446 is pulsed by a pulsing circuit which causes it to short circuit capacitor 444 and the primary of transformer 218. This discharges the capacitor 444 directly into transformer 218. The discharge pulse is coupled to the secondary of transformer 218 which is connected across the gate of triac 212, thereby turning on the triac 212 and allowing current to pass through the lamp 206. Similarly, the open node 270, when it goes high, draws current through resistor 448 and charges capacitor 450 through the primary of transformer 214. Transistor 452 is pulsed by the same pulse source as transistor 446 and discharges capacitor 450 through the primary of transformer 214. The secondary of transformer 214 supplies pulses to the gate of triac 134. This provides the triac 134 with turn-on current to drive the motor 26 in its door opening direction. When the close node 280 goes high, current is drawn through resistor 460 and charges capacitor 462 through the primary of transformer 216. In this case, transistor 464 is pulsed and capacitor 462 discharges through the primary of transformer 216. The pulses generated at the secondary of transformer 216 cause triac 138 to turn on and operate the motor 26 in the door closing direction. The purpose of the transformers 214, 216 and 218 is isolation between the low voltage side of the circuitry and the high voltage side of the circuitry.

The pulses to the transistors 446, 452 and 464 are provided by comparator 470 and flip-flop 472. Comparator 470, along with resistor 474 and capacitor 476 form an oscillator, operating at, illustratively, 2000 Hertz. The output of comparator 470 on lead 478 is fed to the clock input of D-type flip-flop 472, which performs the function of a fast rise time trigger pulser. The rise time, or turn-on time, is approximately 10 nanoseconds and the amount of time that output 480 of flip-flop 472 stays high, approximately 2 microseconds, is dependent upon resistor 482 and capacitor 484. The output on lead 480 is fed to resistor 486, which drives transistor 452; resistor 488, which drives transistor 464; and diode 490, which drives transistor 446. The pulse train is continuous and the pulses occur at twice the oscillator frequency, or approximately 4000 times per second. Since the line voltage is at 60 cycles per second, there are 66 pulses for every cycle of the AC line voltage. This insures that a pulse will be seen by a triac no more than 500 microseconds after the line current rises from zero. The duration of each pulse is so short that it allows capacitors 444, 450 and 462 to charge up to nearly V+ before the next discharge.

The last portion of the operator circuitry to be discussed functions to provide a fifteen second safety reset timer. As soon as the garage door 12 begins a closing stroke, diode 500, which formerly was in its conductive state discharging capacitor 502 through resistor 504, goes into its non-conductive state. This allows capacitor 502 to now charge through resistor 506. Comparator 508 compares the voltage on capacitor 502 to the set point determined by voltage divider resistors 436 and 438. When the voltage at the input 510 of comparator 508 exceeds the set point voltage on the input 512, output 514 of comparator 508 will go high, causing diode 516 to go into its conductive state. This pulls the reset input 284 of flip-flop 250 high, causing the flip-flop 250 to reset, stop the close cycle and start the open cycle. If, however, the close node 280 goes low before the fifteen second time period has expired, the safety timer has no effect, because capacitor 502 never gets fully charged. In this way, if something was wrong with the garage door operator, or if the door 12 gets jammed, and the door 12 never reaches its fully closed position within fifteen seconds, the safety timer will cause the motor 26 to be reversed and reopen the door 12.

Accordingly, there has been described an improved automatic door operator. While this invention has been described with reference to a preferred embodiment thereof, numerous other variations, modifications and adaptations of the present invention will be apparent to those skilled in the art and such as come within the spirit and scope of the appended claims are considered to be embraced by the present invention. For example, although the present invention has been described with respect to a hard wired logic circuit, it is apparent that the present invention contemplates within its scope employment of an appropriately programmed microcomputer or other similar device. Additionally, although a reversible motor with two windings has been illustrated, this invention may also be practiced by using a DC motor whose direction of rotation is dependent upon the polarity of the applied energization, or even by a unidirectionally rotating motor having a mechanically reversible output arrangement. Also, although potentiometric sensing of load and position has been described, it is contemplated that other sensing devices may be utilized such as optical sensors for load and position sensing or strain gages for load sensing.

I claim:

1. An operator for moving a door between first and second positions including a selectively energizable reversible electric motor, drive means for coupling said motor to said door, means for providing a contact closure signal, and control means responsive to the occurrence of a contact closure signal when said door is in one of said first and second positions for energizing said motor to move said door toward the other of said first and second positions, wherein the improvement comprises:
   means coupled to said drive means for generating a force signal having a magnitude directly corresponding to the instantaneous magnitude of the force opposing movement of said door;
   differentiation means for measuring the magnitude of the instantaneous rate of change of said force signal with respect to time and providing an obstruction signal related thereto; and
   safety means responsive to said obstruction signal exceeding a predetermined threshold value for causing said control means to deenergize said motor.

2. The improvement according to claim 1 further including:
   maximum force means for measuring the magnitude of said force signal and providing a partial force signal related thereto; and
   means for combining said partial force signal into said obstruction signal.

3. The improvement according to claims 1 or 2 further including:
   means responsive to the energization of said motor for timing a fixed period; and
   means active during said fixed period for preventing operation of said safety means.

4. The improvement according to claims 1 or 2 wherein said control means includes reversal means responsive to operation of said safety means when said door is being moved toward said first position for energizing said motor so as to move said door back toward said second position.

5. The improvement according to claim 4 further including:
   means for determining when said door is within a predetermined distance of said first position and providing a limit signal responsive thereto; and
   means responsive to said limit signal for preventing operation of said reversal means.

6. The improvement according to claim 1 wherein said drive means includes a chain formed as a loop, a sprocket wheel engaged with said chain and driven by said motor to drive said chain, means for coupling said door to said chain, and an idler around which said chain extends, said force signal generating means including:
   a pivot arm on which said idler is mounted, said pivot arm having an end and a pivot point between said end and said idler;
   a potentiometer having a first end, a second end and a wiper arm movable between said first and second ends;
   means for connecting said potentiometer first end to a first voltage level;
   means for connecting said potentiometer second end to a second voltage level different from said first voltage level;
   means for mechanically coupling said wiper arm to said pivot arm end for movement therewith; and
   means electrically coupled to said wiper arm for providing said force signal.

7. The improvement according to claim 6 wherein said differentiation means includes a capacitor coupled between said wiper arm and said safety means.

8. The improvement according to claim 7 further including a resistor connected across said capacitor, whereby a signal related to the magnitude of said force signal is combined with said obstruction signal which is related to the time rate of change of said force signal and both are provided to said safety means.

9. The improvement according to claim 1 further including:
   means coupled to said drive means for generating a position voltage which is predictably related to the position of said door;
   means for defining a range of voltages having a first limit and a second limit; and
   means responsive to said position voltage reaching one of said first and second limits for causing said control means to deenergize said motor.

10. The improvement according to claim 9 further including means for adjusting said first and second limits of said voltage range.

11. The improvement according to claim 9 wherein said position voltage generating means includes:
    an externally threaded shaft coupled to said drive means for rotation with movement of said drive means in a direction dependent upon the direction of movement of said door;
    a threaded member mounted on said shaft and threadedly engaged therewith;
    means for preventing rotation of said threaded member so that rotation of said shaft will produce movement of said threaded member along the length of said shaft;
    a potentiometer having a first end, a second end and a wiper arm movable between said first and second ends;
    means for connecting said potentiometer first end to a first voltage level;
    means for connecting said potentiometer second end to a second voltage level different from said first voltage level;
    means for mechanically coupling said wiper arm to said threaded member for movement therewith; and
    means electrically coupled to said wiper arm for providing said position voltage.

12. The improvement according to claim 11 wherein said means for defining said range of voltages includes:
    a first limit potentiometer having a first end, a second end and a wiper arm movable to a first limit position between said first and second ends;
    a second limit potentiometer having a first end, a second end and a wiper arm movable to a second limit position between said first and second ends;
    means for connecting said first end of said first limit potentiometer to said first voltage level;
    means for connecting said second end of said second limit potentiometer to said second voltage level;
    means for connecting said second end of said first limit potentiometer to said first end of said second limit potentiometer;
    means for coupling to said wiper arm of said first limit potentiometer to define said first limit of said voltage range; and
    means for coupling to said wiper arm of said second limit potentiometer to define said second limit of said voltage range.

13. The improvement according to claim 1 wherein said control means is further responsive to the occurrence of a contact closure signal when said door is being moved for deenergizing said motor so as to stop movement of said door.

14. The improvement according to claim 13 wherein said control means includes reversal means responsive to the occurrence of a contact closure signal when said door is being moved toward said first position for energizing said motor so as to move said door back toward said second position.

15. The improvement according to claim 14 further including:
    means for determining when said door is within a predetermined distance of said first position and providing a limit signal responsive thereto; and
    means responsive to said limit signal for preventing operation of said reversal means.

16. The improvement according to claim 1 wherein said motor includes a first winding energizable to cause said motor to rotate in a first direction and a second winding energizable to cause said motor to rotate in a second direction, said improvement further including for each of said windings:
    a first controllable switching device having a control input and a switched current carrying path, said current carrying path being serially connected between said each winding and a source of power;
    a transformer having a primary winding and a secondary winding, the secondary winding being connected to said control input of said first switching device;
    a capacitor serially connected to the primary winding of said transformer;
    a second controllable switching device having a control input and a switched current carrying path, said current carrying path of said second switching device being connected across the series connection of said capacitor and said primary winding;
a source of regularly recurring pulses;
means for applying said pulses to said control input of said second switching device; and
means for selectively supplying charging current to said capacitor;
whereby when charging current is supplied to said capacitor, it is repeatedly charged and is discharged by said second switching device to couple pulses to the control input of said first switching device so as to energize said each winding.

17. An operator for moving a door between first and second positions comprising:
a selectively energizable reversible electric motor;
drive means for coupling said motor to said door;
means for providing a contact closure signal;
control means responsive to the occurrence of a contact closure signal when said door is in one of said first and second positions for energizing said motor to move said door toward the other of said first and second positions;
obstruction sensing means for providing an obstruction signal in response to an excessive force opposing movement of said door;
reversal means included in said control means and responsive to the occurrence of either a contact closure signal or an obstruction signal when said door is being moved toward said first position for energizing said motor to move said door back toward said second position;
means coupled to said drive means for generating a position voltage which is predictably related to the position of said door;
means for defining a range of voltages having a first limit corresponding to said first position and a second limit corresponding to said second position;
means for defining a third limit voltage within said range, said third limit voltage differing from said first limit voltage by a fixed amount corresponding to a fixed travel distance of said door; and
means responsive to said position voltage being between said first and third limit voltages for preventing operation of said reversal means.

18. The operator according to claim 17 further including means for adjusting said first and second limits of said voltage range, whereby said third limit voltage remains said fixed amount away from said first limit.

19. The operator according to claim 17 wherein said contact closure responsive means includes means for sensing the time duration of said contact closure signal and only responding when the time duration exceeds a fixed time threshold.

* * * * *